Aug. 27, 1957   E. E. SHELDON   2,804,561
X-RAY CAMERA
Original Filed March 9, 1948

INVENTOR:
EDWARD EMANUEL SHELDON.
BY
his ATTORNEY.

United States Patent Office 2,804,561

Patented Aug. 27, 1957

2,804,561

X-RAY CAMERA

Edward Emanuel Sheldon, New York, N. Y.

Original application March 9, 1948, Serial No. 13,916, now Patent No. 2,555,424, dated June 5, 1951. Divided and this application June 1, 1951, Serial No. 229,493

8 Claims. (Cl. 313—65)

This invention relates to an improved method and device for intensifying images and refers more particularly to an improved method and device for intensifying images formed by the X-ray radiation and other invisible radiations, such as gamma rays and the like, and also irradiation by beams of atom particles, such e. g. neutrons, and it is a division of my co-pending application for Method and Device for Fluoroscopy and Radiography, Serial No. 13,916, filed March 9, 1948, and which is now U. S. Patent No. 2,555,424 issued on June 5, 1951, and also has subject matter in common with my U. S. Patent No. 2,603,757.

One primary object of this invention is to provide certain means for a method and device to produce intensified X-ray images. This intensification will improve the efficiency of the present X-ray fluoroscopic examinations. At the present level of illumination of the fluoroscopic image, the human eye has to rely exclusively on scotopic (dark adaptation) vision, which is characterized by a tremendous loss of normal visual acuity in reference both to detail and to the contrast.

Another object of this invention is to make it possible to prolong the fluoroscopic examination since it will reduce markedly the total strength of radiation affecting the patient's body. Conversely, the exposure time or energy necessary for the radiography may be reduced.

Another object is to provide a method and device to produce sharper X-ray fluoroscopic and radiographic images than was possible until now.

Another important objective of this invention is to provide a method and device to amplify the contrast of the X-ray image.

Without intensification of luminosity of at least of the order of 1000, the eye is confined to so-called scotopic vision at which it is not able to perceive definition and contrast of the fluoroscopic image. It is well known that intensification of the brightness of the X-ray fluoroscopic image cannot be achieved by increase of energy of the X-ray radiation, as it will result in damage to the patient's tissues. Therefore, to obtain the objects of this invention, a special X-ray sensitive pick-up tube had to be designed.

This novel X-ray pick-up tube is characterized by elimination of the optical system which resulted in 20-30 fold gain in the light reaching the photocathode. This gain of incident light on photocathode allowed to activate the television system, which before was not possible as with the amount of incident light available after passage through the focusing optical system, the signal to noise ratio was too low for satisfactory results.

To accomplish the objective of this invention, a composite X-ray sensitive screen consisting of a photoemissive layer and of X-ray fluorescent or reactive layer, is positioned within a novel X-ray pick-up tube to function as a receiving photocathode for the invisible X-ray image. This combination represents a basic improvement, as it results in 20-30 fold gain in light reaching the photoemissive layer because of elimination of the optical system. The importance of this construction is clear when it is considered that the most sensitive television pick-up tubes have a threshold of operation at above 0.01 millilambert at which level the sharpness of produced image is unsatisfactory.

It is obvious, therefore, that the elimination of the optical system disposed between the fluorescent screen and television pick-up tube represents an important improvement in securing the necessary amount of light for operation of the tube. Still better results were obtained by the use of a very thin light reflecting layer such as, for example, of aluminum deposited on the surface of the composite screen, nearest the source of X-ray radiation in order to increase the transfer of light to the photoemissive layer. In some cases, it is very important to interpose between the fluorescent and photoemissive layers a very thin light transparent, chemically inactive barrier layer.

The signal to noise ratio controlling the sharpness and contrast of the image was further improved by the use of series of composite screens each consisting of electron transparent light reflecting layer, electron fluorescent layer, chemically inactive light transparent layer and of photoemissive layer, which screens are disposed in the novel X-ray pick-up tube in succeeding stages. The X-ray image is converted in the composite X-ray sensitive photocathode into photoelectron image. The photoelectron image is accelerated and focused by the electrical or magnetic field, on the next electron sensitive composite screen, whereby an intensified photoelectron image is produced, which again may be focused on the next electron sensitive composite screen, producing further intensification of image.

Additional gain in signal to noise ratio can be obtained by increasing the output of light from the fluorescent layer of composite photocathode and screens. This was accomplished by covering the surface of the fluorescent layer with multiple cone-line or pyramid-like depressions. In this way the emission of fluorescence was increased in the ratio equal to the relation between the surface of the cone and the surface of its base and is, therefore, many times larger than the fluorescence of an even fluorescent screen.

Further intensification of the X-ray image was obtained by the use of one or plural electron multipliers disposed between the composite X-ray sensitive photocathode described above and the scanning target of the X-ray sensitive pick-up tube. The photo-electron image having the pattern of the X-ray image, emitted by the composite X-ray sensitive photocathode, is accelerated and focused by the electric or magnetic fields on the secondary electronemissive electrode, whereby an intensified electron image is produced.

In some instances, it is advantageous to demagnify the electron image emitted by the first composite X-ray sensitive screen before projecting it on the next composite screen or on the electron multiplier electrode. The electron diminution of the image results in its intensification proportional to the linear decrease of its size. Next, the intensified photoelectron image is stored in the target of the X-ray sensitive pick-up tube, for a predetermined period of time, then is scanned by electron beam and converted into video signals. Video signals are sent to amplifiers. By the use of variable mu amplifiers in one or two stages, intensification of video signals can be produced in non-linear manner, so that small differences in intensity of succeeding video signals can be increased one to ten times, producing thereby a corresponding gain of the contrast of the final visible image in receivers, which was one of the objectives of this invention.

In some cases it may be necessary to include a special storage tube in the X-ray image intensifying system in order to overcome the flicker resulting from long frame time. In such case, video signals are sent to the storage tube having photocathode of mosaic or grid type and are deposited there by means of modulating electron scanning beam of said storage tube. The stored electrical charges having the pattern of X-ray image are released from the photocathode after predetermined time by scanning it with another electron beam or by irradiating it with light. The released electron image is converted again into video signals and sent to final receivers to produce visible image with desired intensification and gain in contrast and sharpness.

The invention will appear more clearly from the following detailed description when taken in connection with the accompanying drawings by way of example only preferred embodiments of the inventive idea.

Figure 1:
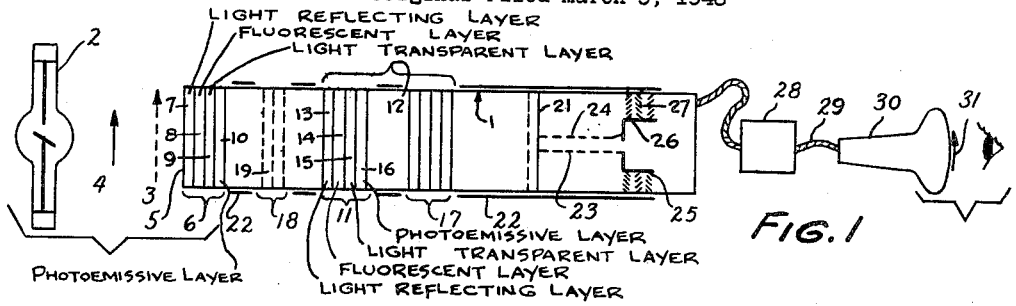
Figure 1 is a cross-sectional view of the X-ray image intensifying system showing the X-ray sensitive pick-up tube.

Reference now will be made to Figure 1, which illustrates new X-ray sensitive pick-up tube 1 to accomplish the purposes of the invention as outlined above. The X-rays 2 produce invisible X-ray image 3 of the examined body 4. The invisible X-ray image 3 penetrates through the face 5 of the X-ray sensitive pick-up tube and activates the composite screen 6 acting as a photocathode and which consists of a very thin X-ray transparent light reflecting layer 7 such as e. g. of aluminum, of X-ray fluorescent layer 8, of chemically inactive light transparent barrier layer 9 and of photoemissive layer 10. The face 5 of the tube is of material transparent to radiation used for examination.

The fluorescent layer 8 and the photoemissive layer 10 should be correlated so that under the influence of the particular radiation used there is obtained a maximum photoemissive effect. More particularly the fluorescent layer should be of a material having its greatest sensitivity to the type of radiation to be used and the photoemissive material likewise should have its maximum sensitivity to the wave length emitted by the fluorescent layer. Fluorescent substances that may be used are: zinc silicates, zinc selenides, zinc sulphide, calcium tungstate or $BaPbSO_4$ with or without activators. The satisfactory photo-emissive material will be caesium oxide, activated by silver, caesium, potassium or lithium with antimony or bismuth. An extremely thin light transparent chemically inactive barrier layer 9 should separate the fluorescent 8 and photoemissive layers 10. The barrier layer 9 can be an exceedingly thin light transparent film of mica, glass, silica, $ZnF_2$ or of a suitable plastic. The X-ray image 3 is converted in the fluorescent layer 8 of the composite photocathode 6 into a fluorescent image and then in the photoemissive layer 10 into a photoelectron image. The photoelectron image having the pattern of the X-ray image is accelerated by electric fields and is focused by means of magnetic or electrostatic fields on the first composite screen 11 of the image amplifying section 12 of the tube. The amplifying section 12 has one or a few successively arranged composite screens 11 each of them consisting of electron pervious, light reflecting layer 13, of layer 14 fluorescing when irradiated by electrons, of chemically inactive barrier layer 15 transparent to fluorescent light and of photoemissive layer 16. Fluorescent substances which may be used for the composite screen are zinc silicates, zinc selenides, zinc sulphide, calcium tungstate or $BaPbSO_4$, with or without additional activators. The satisfactory photoemissive materials are caesium oxide activated by silver, caesium with antimony or with bismuth or antimony with lithium or potassium. The barrier layer 15 between the fluorescent and photoemissive surfaces can be a very thin light transparent layer of mica, glass, $ZnF_2$, of silica or of a suitable plastic. The electron pervious light reflecting layer 13 may be of aluminum or of silver. The photoelectron image from the photocathode 6 focused on the composite screen 11 causes fluorescence of its fluorescent layer 14 which activates the photoemissive layer 16 producing an intensified photoelectron image having the pattern of the X-ray image. The intensified photoelectron image can be again focused on the next composite screen 17, whereby its further intensification is achieved.

The fluorescent layer in the composite photocathode and in the composite screens should be pitted with multiple cone-like or pyramide-like depressions. In this way the emission of fluorescence is increased in the ratio equal to the relation between the surface of the cone and the surface of the base of the cone and is therefore many times larger than the fluorescence of an even fluorescent screen.

In some instances, it is advantageous to demagnify the photoelectron image emitted by the composite photocathode 6 before projecting it on the composite screen 11 of the amplifying section 12. The electron diminution of the image is accomplished by means of electrostatic or magnetic fields which are well known in the art and, therefore, are omitted in order not to complicate drawings.

In some applications it may be preferable to use in conjunction with amplifying section 12 the electron multiplier section 18 consisting of one or few stages of secondary electron multipliers 19 which serves to intensify further the electron image. In such a case the electron image from the composite photocathode is focused by means of electrostatic or magnetic fields on the first stage 19 of the multiplier section. This results in intensification of the electron image by secondary emission. The secondary electrons emitted from the first stage and having the pattern of the X-ray image may be focused after acceleration on the second stage of the multiplier section, producing thereby further intensification of the electron image. The electron image produced by electron multiplier section of the tube is projected on the first composite screen 11 of the amplifying section 12 of the pick-up tube for further intensification. The electron image produced by the amplifying section of the tube is focused on the two-sided target 21 producing therein pattern of electrical charges corresponding to the X-ray image. The electron image can be stored in the target for a predetermined time by choosing proper resistivity and conductivity of target material. The target 21 is scanned by electron beam 23 from the electron gun 25. The scanning electron beam is modulated by the pattern of electrical charges on the target so that the returning beam 24 carries video information. The returning electron beam strikes the first stage of the electron multiplier 26. The secondary electrons from the first stage of the multiplier strike the succeeding stage 27, around and in the back of the first stage. This process is repeated in a few stages resulting in a marked multiplication of the original electron signals. The signal currents from the last stage of the multiplier are fed into television amplifiers 28 and then sent by coaxial cable 29 or by high frequency waves to the receivers of kinescope type 30 or facsimile type in which they are reconverted into visible image 31 for inspection or for recording. In order to obtain amplification of contrast of the X-ray image the amplifiers 28 are provided with variable mu tubes in one or two stages. Small differences in intensity of the succeeding video signals are increased by variable mu tubes in nonlinear manner resulting in a gain of the contrast of the visible image in receivers. The focusing, synchronizing and deflecting circuits 22 are not shown in detail as they are well known in the art and would complicate drawings.

Figures 2, 2A, 3, 4, 5:
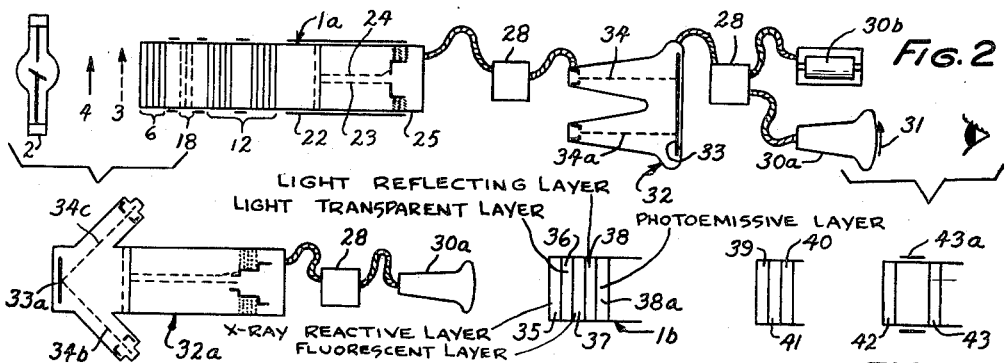
Figures 2 and 2a are cross-sectional views of the X-ray image intensifying system showing in addition X-ray image storage tube.
Figure 3 is a sectional view of the front portion of the X-ray pick-up tube showing an alternate form of the X-ray pick-up tube.
Figure 4 is a sectional view of the front portion of the X-ray pick-up tube showing an alternate form of the X-ray pick-up tube.
Figure 5 is a sectional view of the front portion of the X-ray pick-up tube showing an alternate form of the X-ray pick-up tube.

An improvement in operation of the X-ray image intensifying system was obtained by use of a special storage tube for video signal (see Fig. 2). By the use of storage tube the scanning time in the X-ray pick-up tube can be prolonged, as well as the frame time resulting in a proportionally greater electron output of the composite photocathode. The flicker caused by prolongation of frame time can be in this way successfully eliminated. The X-ray image in the form of the video signals is sent from the X-ray pick-up tube 1a to the storage tube 32 and is deposited there, by means of modulating electron scanning beam 34 of said storage tube, in a special target 33 in which it can be stored for a predetermined time. The stored electrical charges having the pattern of X-ray image are released from the target 33 by scanning it with another electron beam 34a. In another variety of the storage tube, see Fig. 2a, the X-ray image is stored in the photocathode 33a of the storage tube 32a by modulating electron beam 34b and is released by irradiating said photocathode with ultraviolet or blue light. An additional electron beam 34c serves to wipe off the remaining electron charges in the photocathode 33a before storing another X-ray image. The electron image released from storage is converted again into video signals and sent to final receivers 30a and 30b to produce visible image.

An alternative of this invention, see Fig. 3, consists of using composite photocathode in the X-ray pick-up tube 1b having an X-ray reactive layer of electron emitting tube 35, such as e. g. lead or bismuth between the face of the tube and light reflecting layer 36 so that electrons liberated by X-ray radiation from the X-ray reactive layer will excite the adjacent fluorescent layer 37 whose fluorescence will in turn activate the adjacent suitable photoemissive layer 38a through light transparent barrier layer 38. In another form of the invention, see Fig. 4, the X-ray reactive layer 39 of the composite photocathode is in close apposition to the secondary electron emissive layer 40 such as e. g. CsO:Cs; Ag:Mg, both layers separated from each other only by very thin electron pervious chemically inactive barrier layer 41. In some instances it is preferable to eliminate the barrier layer, see Fig. 5, and to focus electron image from the X-ray reactive layer 42 on the electron emissive layer 43 by means of magnetic or electrostatic fields 43a.

Figure 6:
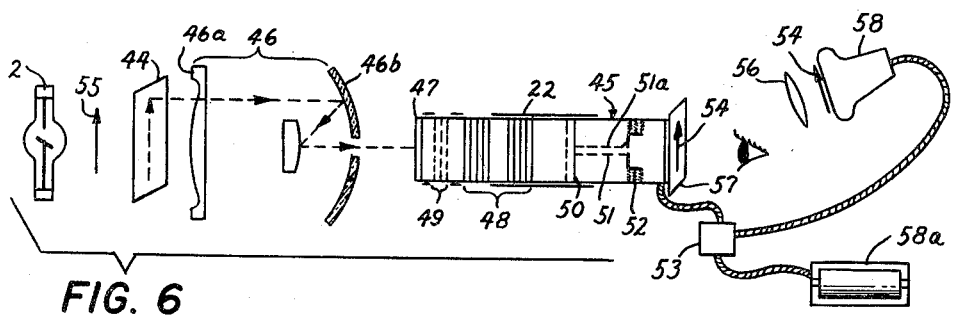
Figure 6 is a cross-sectional view of an alternate form of the X-ray image intensifying system showing the position of optical system and of X-ray pick-up tube.

In another alternative of this invention, see Fig. 6, the X-ray image of the examined body 55 is converted into a visible fluorescent image in the fluorescent screen 44 positioned outside of the X-ray pick-up tube 45 and is projected by the optical system 46 onto photocathode 47 of the X-ray pick-up tube 45.

As explained above the loss of light caused by the use of the optical system makes it impossible to activate the most sensitive television pickup-tube with the X-ray fluorescent image of the human body. Using the reflective optical system, there is obtained five-eighths fold gain in light reaching the photocathode of the pick-up tube from the fluorescent screen. This gain being still not sufficient to activate the standard television pick-up tube, a novel pick-up tube was designed. The novel pick-up tube 45 is characterized by the amplifying section 48 consisting of single or plural composite screens and of electron multiplier section 49 which both were described in detail above. The X-ray fluorescent image is projected by the reflective optical system 46 which in this particular case consists of a spherical correction plate 46a, of a spherical concave mirror 46b and of an auxiliary plane or convex spherical mirror 46c, but may have also different forms, well known to those skilled in the art, onto photocathode 47 to be converted there into photoelectron image. The photoelectron image after multiplication in the multiplier section 49 and after intensification in the amplifying section 48 of the novel pick-up tube is focused by means of magnetic or electrostatic fields on the target 50 where it is further intensified by secondary emission and stored. The target is scanned by electron beam 51. The latter is modulated by the electron pattern in the target corresponding to the X-ray image, so that returning electron beam 51a brings the signals to the multiplier 52. The electron signals after intensification by the multi-stage multiplier 52 are sent in the form of video signals to the amplifier system 53 and therefrom to the immediate 58 or remote receivers 58a to produce visible image 54 with desired luminosity and gain in contrast.

In many instances the distance between the examined body and examiner must be smaller than arms length in order to enable the examiner to palpate the examined body while inspecting its image. It is also very important to have the examined part of the body and its image in the final receiver in a straight optical axis with the eyes of examiner. A suitable arrangement to accomplish this objective is demonstrated in Fig. 6, in which the kinescope 58 is disposed distally to the X-ray pick-up tube 45 and the final image 54 appearing in the kinescope is projected by the optical system 56 on the surface 57 which is in straight axis with the examined body 55 and at the same level with it.

Figure 7:
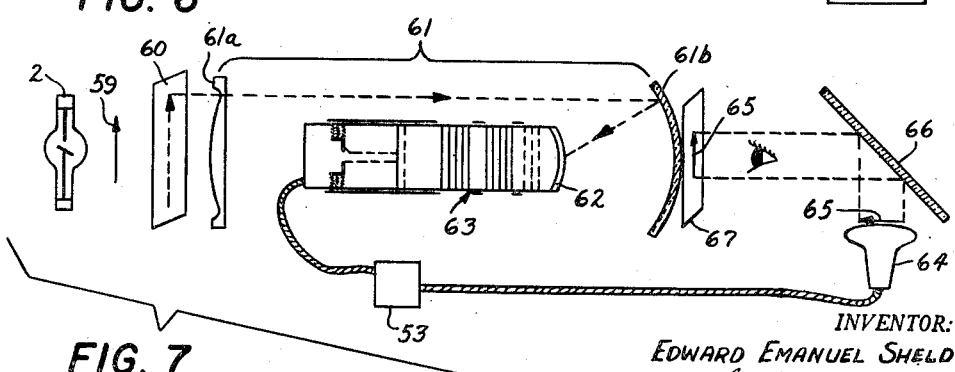
Figure 7 is a cross-sectional view of the X-ray image intensifying system showing modified form of the optical system.

Another alternative satisfying these objectives is shown in Fig. 7, in which the X-ray fluorescent image 60 is projected by the reflective optical system 61 consisting of a spherical plate 61a and of spherical mirror 61b, onto photocathode 62 of the X-ray pick-up tube 63 and is televised to the kinescope 64. The final image 65 in the kinescope is reflected by a plane mirror 66 on the surface 67 which is in straight axis with the examined part of the body 59 and is at the same level with it.

As various possible embodiments might be made of the above invention and as various changes might be made in the embodiment above set forth, it is to be understood that all matter herein set forth or shown in the accompanying drawings is to be interpreted as illustrative and not in a limiting sense.

What is claimed is:

1. A vacuum tube comprising in combination luminescent means, a continuous light transparent and also transparent to ultraviolet radiation emitted by said luminescent means, layer in contact with said luminescent means, and a photoemissive layer for converting an image formed by said luminescent means into a photoelectron beam said photoemissive layer being in contact with said light transparent layer, and a composite electrode for receiving said photoelectron beam, said electrode comprising a light reflecting layer pervious to said electron beam and facing said photoemissive layer, luminescent means in contact with said light reflecting layer and receiving said beam through said light reflecting layer, a light transparent sperating layer also transparent to ultraviolet radiation in contact with said luminescent means and a photoelectric layer in contact with said light transparent layer.

2. A device as defined in claim 1, in which said photoemissive layer comprises an element selected from the group consisting of antimony and bismuth.

3. A device as defined in claim 1, which in addition comprises means for converting said electron beam into video signals.

4. A device as defined in claim 1, in which said photoelectric layer has a continuous surface.

5. A vacuum tube comprising in combination luminescent means, a light transparent and electrically conducting layer in contact with said luminescent means and a photoemissive layer in contact with said light transparent layer for converting an image into a photoelectron beam, and a composite electrode for receiving said photoelectron beam, said electrode comprising a light impervious layer, which is pervious to said beam and which is facing said photoemissive layer, a luminescent layer adjacent to said light impervious layer and receiving said beam through said light impervious layer, a light transparent electrically conducting layer in contact with said luminescent layer and a photoelectric layer in contact with said light transparent layer.

6. A device as defined in claim 5 in which said photoemissive layer comprises an element selected from the group consisting of antimony and bismuth.

7. A device as defined in claim 5 which in addition comprises means for converting said electron beam into video signals.

8. A device as defined in claim 5, in which said photoelectric layer has a continuous surface.

References Cited in the file of this patent

UNITED STATES PATENTS

| | | |
|---|---|---|
| Re. 23,802 | Sheldon | Mar. 16, 1954 |
| 2,177,259 | Keck | Oct. 24, 1939 |
| 2,198,479 | Langmuir | Apr. 23, 1940 |
| 2,203,347 | Batchelor | June 4, 1940 |
| 2,219,113 | Ploke | Oct. 22, 1940 |
| 2,270,373 | Kallmann et al. | Jan. 20, 1942 |
| 2,297,478 | Kallmann | Sept. 29, 1942 |
| 2,344,042 | Kallmann et al. | Mar. 14, 1944 |
| 2,344,043 | Kallmann et al. | Mar. 14, 1944 |
| 2,433,941 | Weimer | Jan. 6, 1948 |
| 2,555,545 | Hunter et al. | June 5, 1951 |
| 2,640,162 | Espenchied et al. | May 26, 1953 |
| 2,690,516 | Sheldon | Sept. 28, 1954 |
| 2,697,182 | Sheldon | Dec. 14, 1954 |
| 2,700,116 | Sheldon | Jan. 18, 1955 |